(12) United States Patent
Vickers et al.

(10) Patent No.: US 8,331,491 B2
(45) Date of Patent: Dec. 11, 2012

(54) SIGNAL DEROTATING RECEIVER

(75) Inventors: Martin Vickers, Bristol (GB); Thomas Foxcroft, Bristol (GB)

(73) Assignee: Entropic Communications, Inc., San Diego, CA (US)

( * ) Notice: Subject to any disclaimer, the term of this patent is extended or adjusted under 35 U.S.C. 154(b) by 708 days.

(21) Appl. No.: 10/340,577

(22) Filed: Jan. 10, 2003
(Under 37 CFR 1.47)

(65) Prior Publication Data

US 2004/0028161 A1 Feb. 12, 2004

(30) Foreign Application Priority Data

Jul. 12, 2000 (GB) .................................. 0017132.2
Oct. 18, 2000 (GB) ....................... PCT/GB00/04001

(51) Int. Cl.
*H04L 27/00* (2006.01)
(52) U.S. Cl. ......................................................... 375/316
(58) Field of Classification Search .................. 375/316, 375/340, 346, 229, 324
See application file for complete search history.

(56) References Cited

U.S. PATENT DOCUMENTS

| | | | |
|---|---|---|---|
| 6,233,276 B1 * | 5/2001 | Simeon | 375/232 |
| 6,456,654 B1 * | 9/2002 | Ginesi et al. | 375/229 |
| 6,704,374 B1 * | 3/2004 | Belotserkovsky et al. | 375/326 |

FOREIGN PATENT DOCUMENTS

| | | |
|---|---|---|
| EP | 0933903 | 8/1999 |
| EP | 1005205 | 5/2000 |
| EP | 1049301 | 11/2000 |
| JP | 10-75228 | 3/1998 |
| WO | WO 0021228 | 4/2000 |

OTHER PUBLICATIONS

Mignone, Vittoria et al., "CD3-OFDM: A Novel Demodulation Scheme for Fixed and Mobile Receivers", IEEE Transactions on Communications, Sep. 1996, pp. 1144-1151, vol. 44, No. 9.

* cited by examiner

*Primary Examiner* — Kevin M Burd

(57) ABSTRACT

A receiver, for example a receiver of broadcast digital terrestrial television signals modulated using COFDM (Coded Orthogonal Frequency Division Multiplexing), imposes a phase adjustment on a received signal. Phase adjustment may be effected, for example, by sample alignment of the signal, such as for cyclic prefix removal, or by shifting a window setting for a Fast Fourier Transform (FFT) processor. Before channel estimation or decoding is performed on the information stream, the information stream is derotated to compensate for the phase adjustment previously imposed on the received signal.

32 Claims, 2 Drawing Sheets

SIGNAL DEROTATING RECEIVER

CROSS-REFERENCE TO RELATED APPLICATIONS

This application claims the effective filing date under 35 USC §§ 120 and 363 to PCT International Application. No. PCT/GB00/04001, entitled "Television Receiver", filed Oct. 18, 2000 designating the U.S. and published under PCT Article 21(2) in English as International Publication No. WO 02/05550 A1 entitled "Television Receiver," of which this application is a continuation, which PCT application claims priority to Great Britain Patent Application No. 0017132.2, filed Jul. 12, 2000. This application claims priority under 35 USC 119(a) to Great Britain Patent Application No.: 0017132.2, filed Jul. 12, 2000.

BACKGROUND OF THE INVENTION

1. Field of the Invention

This invention relates to a communication receiver.

2. Description of Related Art

The European DVB-T (Digital Video Broadcasting-Terrestrial) standard for digital terrestrial television (DTT) uses Coded Orthogonal Frequency Division Multiplexing (COFDM) of transmitted signals, which are therefore grouped into blocks and frames.

After reception in the television receiver, the signals are sampled, for example using a resampler, and are mixed down to baseband. The start of each active symbol is found, and then the active symbols are applied to a Fast Fourier Transform (FFT) processor, and subsequently to a channel estimator, to extract the wanted information.

It is necessary to transmit the DTT signals over transmission paths which are of uncertain quality. In particular, the area close to the transmission path may include objects such as tall buildings, which cause echoes. That is, a signal may be received at a receiver twice, once on a direct path from the transmitter, and then, after a short delay, as an echo. Further, there may be no direct line of sight from the transmitter to the receiver, in which case the receiver will only receive echoes. The effect of this is that the first signal received may not necessarily have the strongest power. There will therefore be combinations of pre-echoes arriving before the strongest signal and echoes arriving afterwards.

As is well known, this scenario can cause inter-symbol interference (ISI) in the receiver. To reduce the effects associated with this problem, DVB-T COFDM signals include a cyclic prefix guard interval for each active symbol. Specifically, a portion of the active symbol is repeated before the next active symbol.

Once the received signal is converted down to baseband, if there is a large echo present, a time domain correlation between samples which are an active window length apart yield large powers in the guard interval of the echo. These correlations can be used to correctly position the window when large echoes are present, although the technique is not as effective for smaller echoes. If the smaller echoes lag the larger ones, then correct positioning of the windowing relative to the first large echo (or relative to the main signal if no large pre-echo is present), will result in a good solution. On the other hand, if the smaller echo is a pre-echo, this may not be the case, as the pre-echo will be introducing ISI.

One solution to this problem is to pull back the window position, calculated using the correlations in time, which can avoid ISI, but which rotates the signal in the frequency domain. Large rotations in the frequency domain can adversely affect the performance of the channel estimator. Moreover, the guard interval prefix must be removed before the signals are further processed. The initial position of the prefix can be found, and it is also preferable to allow correction for any changes in position caused by subsequent variations in sampling rate. Again such corrections have the effect of rotating the signal in the frequency domain.

SUMMARY OF THE INVENTION

There are many possible reasons for wanting to rotate a received signal, either forwards or backwards, in the frequency domain. However, such rotations can have an adverse effect on channel estimation.

According to a first aspect of the invention, there is provided a receiver circuit which includes a derotator circuit, that is a circuit which can apply a rotation that is equal and opposite to that previously applied, before a signal is applied to a channel estimator.

According to a second aspect of the invention, there is provided a method of processing received signals, that includes applying a rotation which is equal and opposite to that previously applied, before the signal is applied to a channel estimator.

Thus, the rotation that is applied can compensate for that previously applied, thereby improving channel estimation, and ultimately improving signal reception.

DETAILED DESCRIPTION

Figure 1:
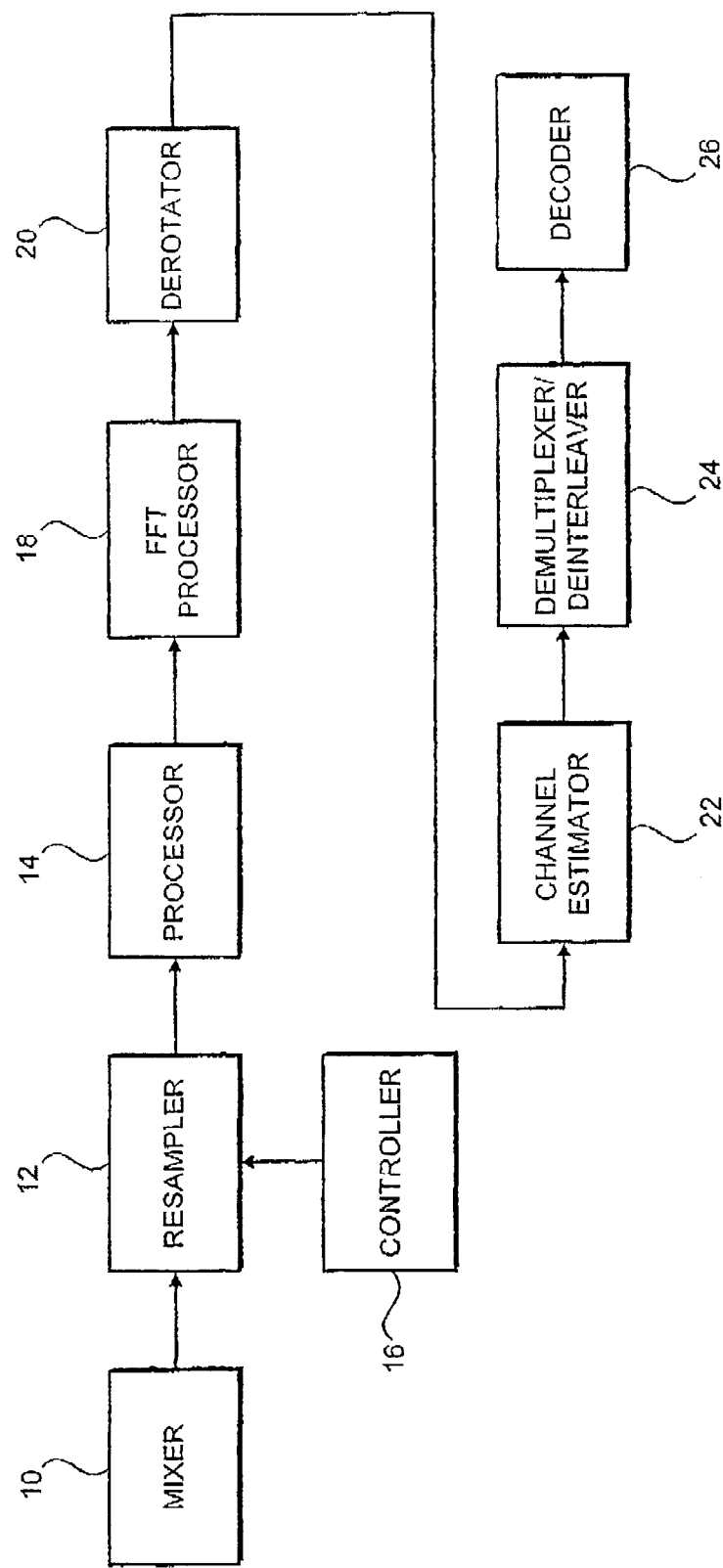
FIG. 1 is a simplified block schematic diagram of a receiver circuit in accordance with the invention.

FIG. 1 shows simplified block diagram of a receiver circuit or system in accordance with the present invention. It will be appreciated that many of the receiver functions can be carried out in a different order from that illustrated in FIG. 1 and as described below, and that FIG. 1 is exemplary only.

Typically, in the exemplary case of a digital terrestrial television signal receiver, for example receiving signals using the DVB-T standard with Coded Orthogonal Frequency Division Multiplexing, the receiver includes an antenna (not shown) and a tuner (not shown) for receiving signals and downconverting the received signals to an intermediate frequency.

As shown in FIG. 1, the receiver further includes a further mixer stage 10, for downconverting to baseband, and a resampler 12, for obtaining digital samples of in-phase (1) and quadrature (Q) components of the signal.

The sampler is controllable in the sense that its sampling position can be adjusted.

Output signals from the resampler 12 are supplied to a processing device 14 that removes the cyclic components preceding each active symbol. In order to be able to do this accurately, the sampling position of the resampler 12 must be controlled such that the assumed position of the start of each symbol accurately coincides with the actual position in the received signal. This control of the sampling position is achieved by adjusting the phase of the resampler 12 under control of a resampler controller 16. Such adjustments of the phase, in effect, rotate the signal in the phase plane.

An algorithm to track the resampler displacement offset should in general not have large corrections in any particular symbol. However, it may be advantageous for it to be able to do so.

The baseband I- and Q-data signals are supplied to a Fast Fourier Transform (FFT) processor 18. However, in order to avoid any problems of inter-symbol interference (ISF) which may be caused by pre-echo signals, that is, attenuated versions of the main signal which arrive at the receiver before the main signal does, the FFT window may be pulled back in time. Again, this has the effect of rotating the spectrum of the main signal.

After processing is performed by the Fast Fourier Transform processor 18, the data signals are supplied to a derotator block 20.

Figure 2:
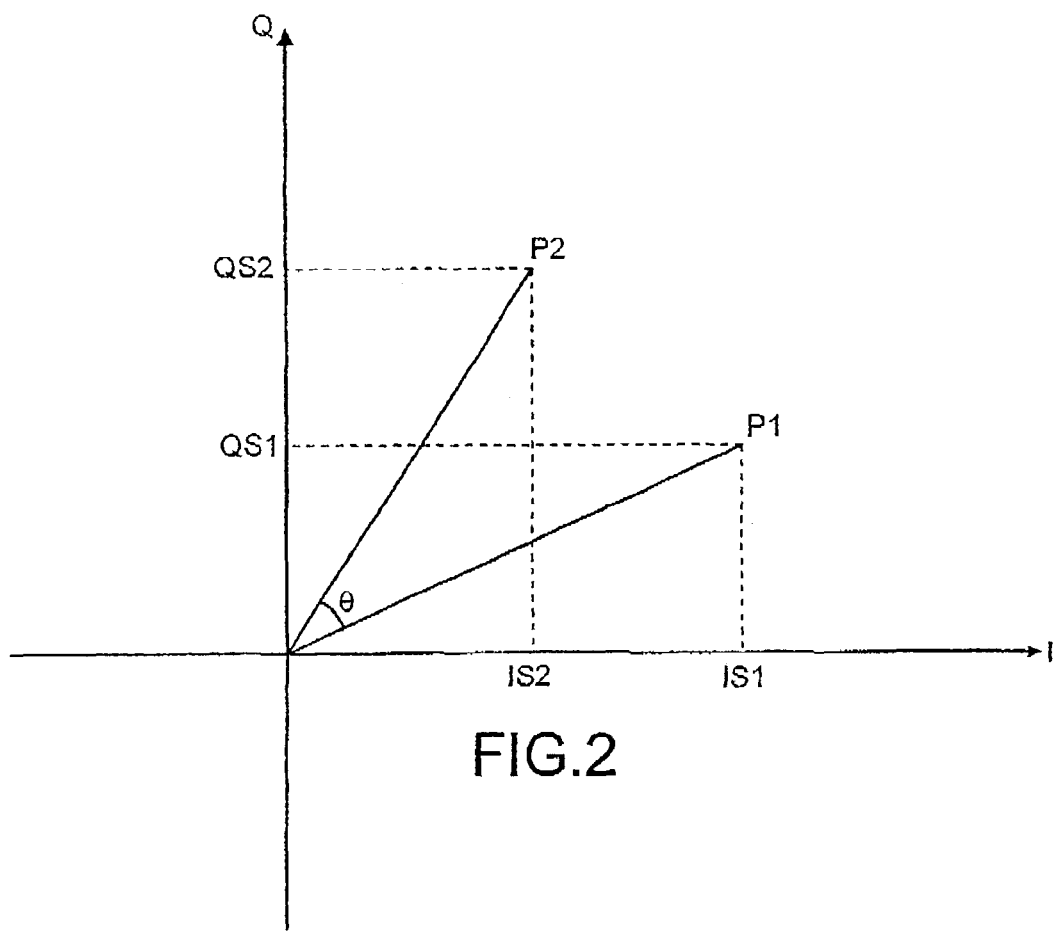
FIG. 2 is an illustration of the operation of the derotator shown in the receiver circuit of FIG. 1.

The operation of the derotator 20 is now described with reference to FIG. 2. FIG. 2 shows the values of the I- and Q-samples at one particular illustrative moment in time. Ignoring the effect of the rotation of the signal introduced by the resampler position correction algorithm and the Fast Fourier Transform processor window position pullback, the sample values would be at the position marked PI in FIG. 2.

However, the resampler position correction algorithm has altered the position of the signal by SP1 samples, and the Fast Fourier Transform processor window position has been pulled back by a further SP2 samples, which have introduced a rotation which means that, thereafter, the sample values are at the position marked P2 (as shown in FIG. 2).

Each sample change in the window position produces a phase ramp across the frequency spectrum from 0 on the DC bin to 360°, or $2\pi$ radians, on the final bin of the FFT processor. Therefore, if the Fast Fourier Transform size is N (which may, for example, be 2048 samples), and n is the bin offset, rotation by a number of samples SP, where SP=SP1+SP2, produces a rotation of θ radians, where:

$$\theta = 2\pi n(SP/N)$$

The derotator 20 therefore detects the amount by which the Fast Fourier Transform processor window position has been pulled back, that is, SP2 samples. The derotator 20 also detects the size of the correction applied to the resampler position in each symbol, and hence the cumulative correction, that is, SP1 samples. The derotator 20 then forms the sum SP of SP1 and SP2, and calculates the total applied rotation θ, as described above.

As is well known, a rotation of a complex value can be achieved by complex multiplication, and, in this case, an equal and opposite rotation is applied to compensate for that previously applied.

Specifically, the corrected sample position S2, having I- and Q-values IS2 and QS2, where:

$$S2 = IS2 + jQS2,$$

is obtained from the input sample position S1, having I- and Q-values IS1 and QS1, where:

$$S1 = IS1 + jQS1,$$

by means of the complex multiplication:

$$IS2 + jQS2 = (IS1 + jQS1)e^{-j\theta}.$$

Referring again to FIG. 1, the output data signal output by the derotator 20 is then input to a channel estimator 22 including an equalizer, demultiplexer and deinterleaver 24 and decoder 26, which recover the originally transmitted bitstream, in a generally conventional way.

The channel equalizer relies upon the channel being steady for multiple symbols. If a large resampler displacement offset is added, then the large phase ramp introduced will introduce an apparent rapid change in the channel and thus degrade the channel equalizer performance. The performance of the channel estimator can be optimized by removal in the derotator 20 of any previously applied rotation, thus improving the performance of the device. Specifically, the derotator can compensate for the introduced phase ramps, and therefore rapid movements in window position are possible, without degrading performance.

For example, in a mobile environment, the window position may advantageously be rotated either forwards or backwards. Although the invention has been described above in terms of a forwards rotation being compensated by a backwards derotation, it will be appreciated that the invention is equally applicable to compensating a backwards rotation of the window, by means of a forward rotation.

The receiver system has been described herein with all of the components on a single device, such as a large scale integrated circuit. However, it will be appreciated that the different functions may be achieved in different devices, and in different ways from those described.

What is claimed is:

1. A receiver comprising:
   a) a phase adjustment circuit configured to change a phase of received signals;
   b) a transformation processor configured to derive frequency domain representations of phase-adjusted signals from the phase adjustment circuit;
   c) a derotator configured to apply a rotation to an output of the transformation processor to counteract any adjustment applied by the phase adjustment circuit, where the rotation is applied by the derotator in order to compensate for an introduced phase ramp from a displacement offset which occurs in the input of the transformation processor; and
   d) a channel estimator configured to estimate channel characteristics based upon an output of the derotator.

2. The receiver of claim 1, wherein the transformation processor operates with a processor window having a window position, and wherein the phase adjustment circuit is configured to adjust the phase of the received signals by changing the window position of the transformation processor.

3. The receiver of claim 2, wherein the phase adjustment circuit further adjusts the phase of the received signals by changing a timing of received signal sampling to align sample timing to a determined feature of the received signal.

4. The receiver of claim 3, further comprising an input section configured to provide baseband signals to a resampler that provides I and Q components of the received signals for processing by the transformation processor, wherein the phase adjustment circuit controls sample timing of the resampler and the window position for the transformation processor.

5. The receiver of claim 4, further comprising a cyclic component removal processor configured to receive the I and Q components from the resampler, and to provide to the transformation processor a portion of the I and Q components that does not include cyclic components.

6. The receiver of claim 1, wherein the phase adjustment circuit introduces phase changes by changing a timing of received signal sampling to align sample timing to a determined feature of the received signals.

7. The receiver of claim 6 wherein the phase adjustment circuit includes a resampler for forming digital samples of the received signals, and is configured to adjust a sample position of the resampler.

8. The receiver of claim 1, wherein the phase adjustment circuit introduces phase changes by changing a window position of timing of received signal sampling to align sample timing to a determined feature of the received signals.

9. The receiver of claim 1, wherein the receiver is configured to receive COFDM television signals.

10. A method of processing a received signal, comprising:
   a) shifting a phase of the received signal to generate a phase shifted signal;
   b) Fourier transforming information from the phase shifted signal to generate phase shifted transformed signal information;
   c) derotating the phase shifted transformed signal information as compensation for phase shifting in step a) to generate derotated signal information, where the derotating of the phase of the received signal removes a resampler displacement offset in order to compensate for an introduced phase ramp; and
   d) applying the derotated signal information to a channel estimator.

11. The method of claim 10, wherein the step a) of shifting a phase of the received signal includes adjusting sample timing of the received signal to effect alignment of samples to a signal feature.

12. The method of claim 10, wherein the step a) of shifting a phase of the received signal includes changing a window position of a Fast Fourier Transform ("FFT") processor.

13. The method of claim 12, wherein the step a) of. shifting a phase of the received signal further includes aligning sample timing of a resampler to cause the phase shifted signal to be aligned for cyclic information removal.

14. The method of claim 13, further including a step e) of removing cyclic information from the aligned phase shifted signal to generate information from the phase shifted signal for the Fourier transformation of step b).

15. A communication signal receiving system, comprising:
   a) a sampling block configured to derive samples of a received signal;
   b) a phase adjustment block configured to adjust a phase of the received signal by changing sample timing of the sampling block to align the sample timing;
   c) a cyclic section removal block configured to derive stripped signal information for further processing by removing cyclic sections from the derived samples; and
   d) a derotator block configured to compensate for phase adjustment imposed by the phase adjustment block by rotating phasing of the stripped signal information to provide derotated signal information, where the rotating phase of the stripped signal information from the phase adjustment block is removed by the derotator block in order to compensate for introduced phase ramps.

16. The system of claim 15, further including a channel estimation block configured to derive channel estimates from the derotated signal information.

17. The system of claim 15, further including a Fast Fourier Transform ("FFT") processor for providing the stripped signal information in frequency domain form to the derotator block.

18. The system of claim 17, wherein the phase adjustment block is configured to further adjust the phase of the received signal by changing a window position of the FFT processor.

19. The system of claim 18, further including a channel estimation block configured to derive channel estimates from the derotated signal information.

20. The system of claim 19, wherein the channel estimation block includes an equalizer, a demultiplexer, and a decoder.

21. The system of claim 15, wherein the sampling block is configured to derive I and Q component samples.

22. The system of claim 15, wherein the phase adjustment block is configured to align the sample timing with a feature of the received signal.

23. A method of processing a received signal, comprising:
   a) shifting a phase of the received signal with a controller to align received signal samples;
   b) removing cyclic information from the received signal samples to produce cyclically stripped signal information;
   c) derotating the cyclically stripped signal information to compensate for any phase shifting in step a), where the derotating of the cyclically stripped signal information compensates for an introduced phase ramp; and
   d) decoding signal information resulting from the step c).

24. The method of claim 23, wherein the step d) includes performing channel estimation.

25. The method of claim 24, wherein the step a) includes adjusting sample timing of a resampler to align the samples with an actual start position of the received signal.

26. The method of claim 23, further comprising a step e) of performing a Fourier transformation of the stripped signal information.

27. The method of claim 26, wherein the step c) includes performing a complex multiplication.

28. The method of claim 27, wherein the step e) includes employing a Fast Fourier Transform ("FFT") processor, and the step a) further comprises adjusting a window position of the FFT processor.

29. The method of claim 23, further including mixing the received signal down to baseband before performing any of the steps a), b), c) or d).

30. A receiver comprising:
   a) means for adjusting a phase of received signals to produce phase adjusted signals;
   b) means for deriving frequency domain ("FD") representations of the phase-adjusted signals;
   c) means for derotating the FD representations of the phase adjusted signals to counteract phase adjustment applied to the received signals by means (a) to produce derotated signals, where the rotation that was applied in the derotated signal compensates for an introduced phase ramp created by a sampler displacement offset; and
   d) means for estimating channel characteristics based upon the derotated signals.

31. The receiver of claim 30, wherein the means for deriving FD representations of the phase-adjusted signals includes means for shifting a Fourier Transformation window position to adjust phase of the phase adjusted signals.

32. The receiver of claim 30, wherein the means for adjusting a phase of received signals includes means for changing a timing of received signal sampling to align sample timing to a determined feature of the received signal.

* * * * *